United States Patent
Deka et al.

(10) Patent No.: US 10,473,217 B2
(45) Date of Patent: Nov. 12, 2019

(54) ENCAPSULATION SYSTEM FOR A VACUUM INSULATED STRUCTURE USING AN ELASTIC ADHESIVE AND BARRIER COATING

(71) Applicant: WHIRLPOOL CORPORATION, Benton Harbor, MI (US)

(72) Inventors: Lakshya J. Deka, Mishawaka, IN (US); Hua Liu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 16/306,723

(22) PCT Filed: Feb. 14, 2017

(86) PCT No.: PCT/US2017/017801
§ 371 (c)(1),
(2) Date: Dec. 3, 2018

(87) PCT Pub. No.: WO2018/151704
PCT Pub. Date: Aug. 23, 2018

(65) Prior Publication Data
US 2019/0128422 A1  May 2, 2019

(51) Int. Cl.
*F16J 15/02* (2006.01)
*F25D 23/08* (2006.01)
*F25D 23/02* (2006.01)
*F25D 23/06* (2006.01)

(52) U.S. Cl.
CPC ............ *F16J 15/022* (2013.01); *F16J 15/02* (2013.01); *F25D 23/02* (2013.01); *F25D 23/06* (2013.01); *F25D 23/085* (2013.01); *F25D 2400/04* (2013.01); *Y02B 40/34* (2013.01)

(58) Field of Classification Search
CPC .... F25D 23/085; F25D 23/082; F25D 23/065; F25D 23/062; F16J 15/022; F16J 15/02
See application file for complete search history.

(56) References Cited

U.S. PATENT DOCUMENTS

| | | | |
|---|---|---|---|
| 5,368,381 A * | 11/1994 | Mandel | F25D 23/062 312/406.2 |
| 5,768,837 A | 6/1998 | Sjoholm | |
| 5,935,695 A | 8/1999 | Baerveldt | |
| 8,597,447 B2 | 12/2013 | Utesch et al. | |
| 8,840,204 B2 | 9/2014 | Bauer et al. | |
| 2009/0031659 A1 | 2/2009 | Kalfon | |
| 2009/0114261 A1 | 5/2009 | Stancel et al. | |

(Continued)

FOREIGN PATENT DOCUMENTS

| | | |
|---|---|---|
| SU | 648780 | 2/1979 |
| WO | 2006077599 | 7/2006 |
| WO | 2014121889 | 8/2014 |

*Primary Examiner* — Daniel J Rohrhoff
(74) *Attorney, Agent, or Firm* — Price Heneveld LLP

(57) ABSTRACT

An appliance includes an outer wrapper, an inner liner, a trim breaker having a channel that receives at least one of a wrapper edge of the outer wrapper and a liner edge of the inner liner and a composite encapsulation system including a base elastic adhesive and an outer barrier coating. The base elastic adhesive and the outer barrier coating define a structural adhesive that hermetically seals an insulation cavity defined between the outer wrapper and the inner liner.

20 Claims, 8 Drawing Sheets

(56) References Cited

U.S. PATENT DOCUMENTS

| | | | |
|---|---|---|---|
| 2012/0297813 A1* | 11/2012 | Hanley | F25D 23/064 |
| | | | 62/331 |
| 2013/0270732 A1* | 10/2013 | Wu | B29C 51/02 |
| | | | 264/101 |
| 2015/0377545 A1 | 12/2015 | Freitag et al. | |
| 2016/0258671 A1* | 9/2016 | Allard | F25D 23/065 |
| 2019/0128594 A1* | 5/2019 | Allard | F25D 23/082 |
| 2019/0170174 A1* | 6/2019 | Deka | F16B 11/006 |
| 2019/0184624 A1* | 6/2019 | Dherde | F25D 23/065 |

* cited by examiner

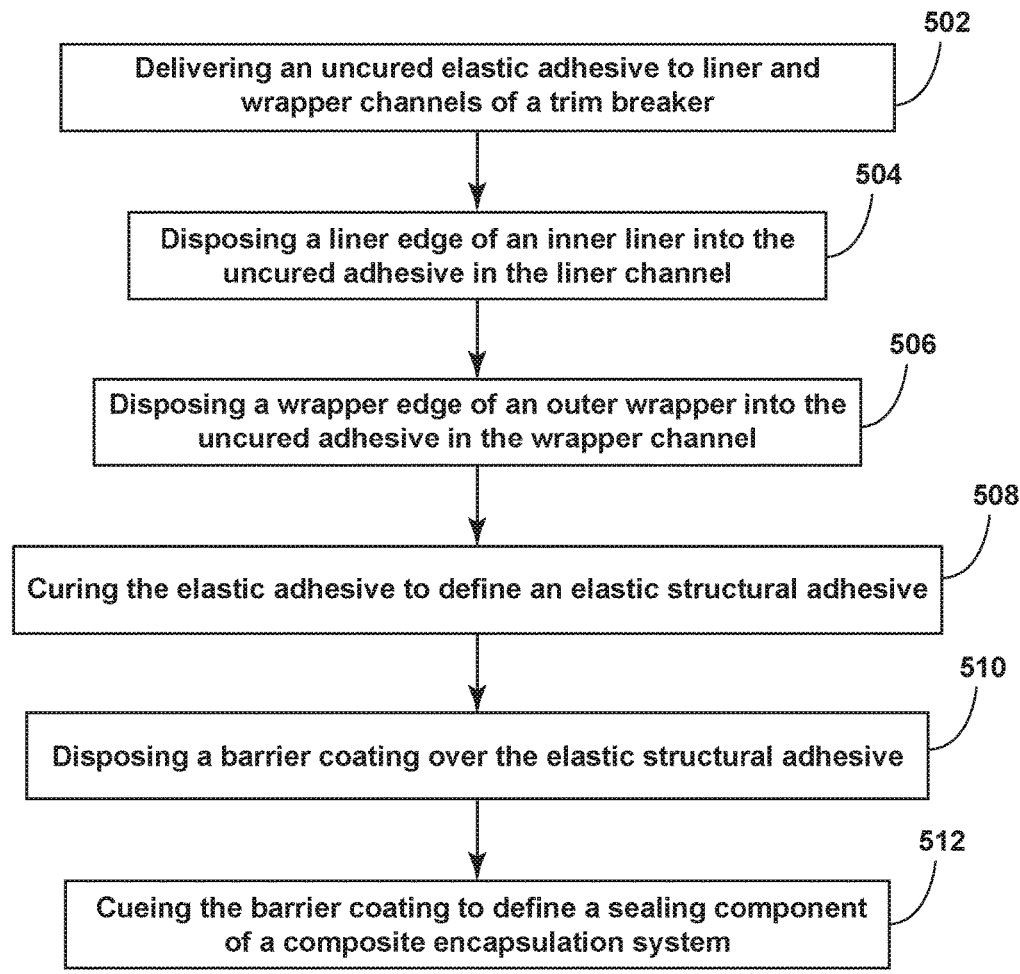

ENCAPSULATION SYSTEM FOR A VACUUM INSULATED STRUCTURE USING AN ELASTIC ADHESIVE AND BARRIER COATING

FIELD OF THE DEVICE

The device is in the field of insulation structures for appliances, and more specifically, an encapsulation system for sealing joints in a vacuum insulation structure that includes an elastic adhesive and a barrier coating.

SUMMARY

In at least one aspect, an appliance includes an outer wrapper, an inner liner, a trim breaker having a channel that receives at least one of a wrapper edge of the outer wrapper and a liner edge of the inner liner and composite encapsulation system including a base elastic adhesive and an outer barrier coating. The base elastic adhesive and the outer barrier coating define a structural adhesive that hermetically seals an insulation cavity defined between the outer wrapper and the inner liner.

In at least another aspect, a method for forming an insulating cabinet for an appliance includes delivering an adhesive base in an uncured state into a channel of a trim breaker. A wrapper edge of an outer wrapper is disposed into the channel so that the adhesive base in the uncured state surrounds both sides of the wrapper edge within the channel. A liner edge of an inner liner is disposed into the channel so that the adhesive base in the uncured state surrounds both sides of the liner edge within the channel and a barrier coating is disposed over the adhesive base. The barrier coating covers the adhesive base and engages the outer wrapper and inner liner at the trim breaker.

In at least another aspect, a method for forming an insulating cabinet for an appliance includes delivering an elastic adhesive base in an uncured state into a wrapper channel and a liner channel of a trim breaker. A wrapper edge of an outer wrapper is disposed into the wrapper channel so that the elastic adhesive base in the uncured state surrounds both sides of the wrapper edge within the wrapper channel. A liner edge of an inner liner is disposed into the liner channel so that the elastic adhesive base in the uncured state surrounds both sides of the liner edge within the liner channel. The elastic adhesive base is cured to define a structural elastic adhesive base. A barrier coating is disposed over the structural elastic adhesive base. The barrier coating extends from an outer edge of the trim breaker to an outside surface of the outer wrapper and also extends from an inner edge of the trim breaker to an inside surface of the inner liner and curing the barrier coating to define a two-part encapsulation system having the structural elastic adhesive base that defines a structural component and the barrier coating in a cured state that defines a sealing component.

These and other features, advantages, and objects of the present device will be further understood and appreciated by those skilled in the art upon studying the following specification, claims, and appended drawings.

BRIEF DESCRIPTION OF THE DRAWINGS

In the drawings:

FIG. 11 is a schematic flow diagram illustrating a method for forming an insulating cabinet for an appliance.

DETAILED DESCRIPTION OF EMBODIMENTS

Figure 1:
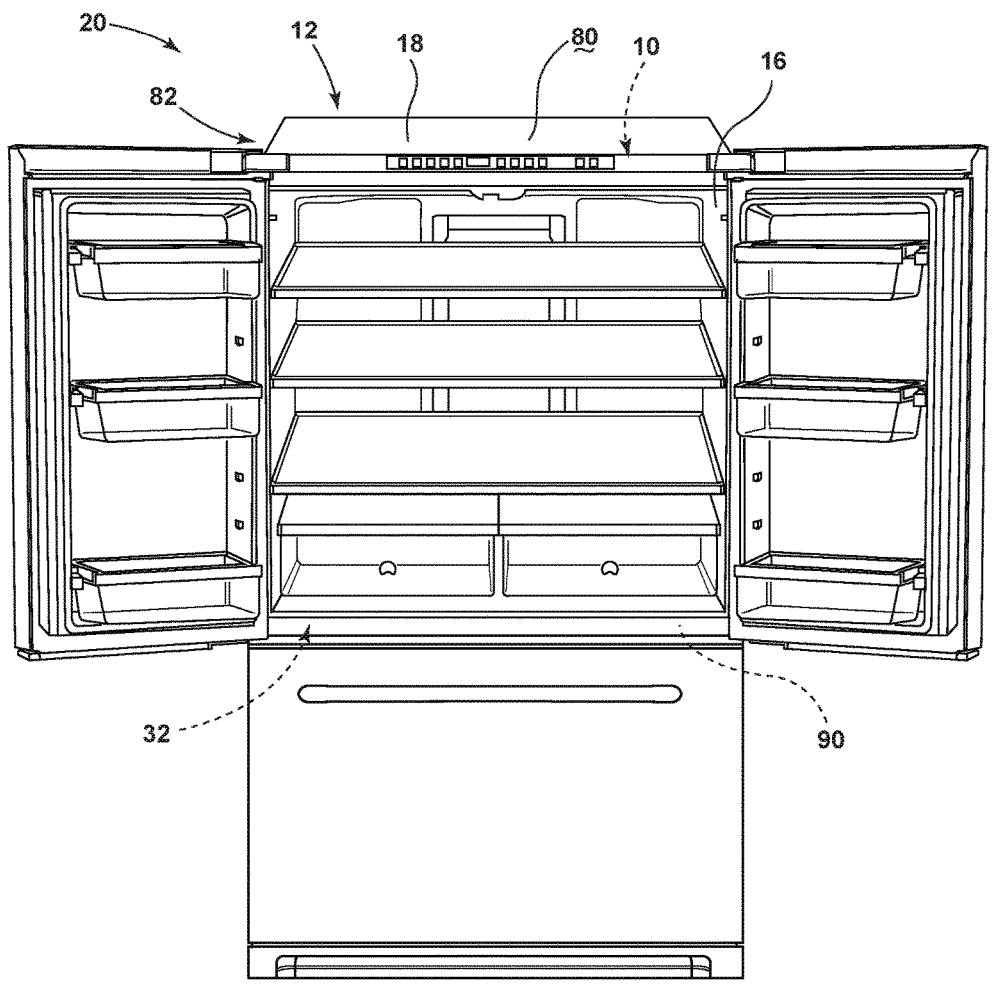
FIG. 1 is a front perspective view of a refrigerated appliance incorporating an aspect of the encapsulation system to seal portions of the cabinet for the appliance.
Figure 2:
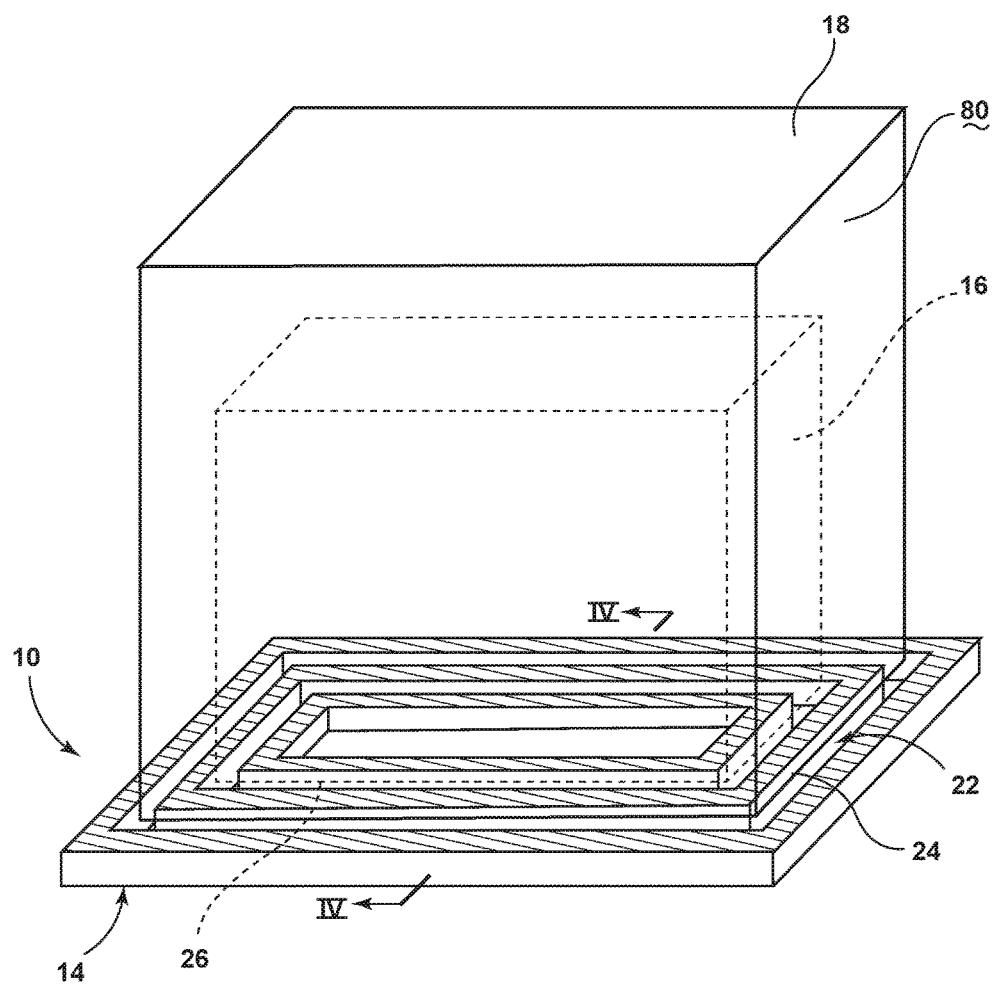
FIG. 2 is a schematic diagram illustrating an aspect of the encapsulation system for sealing the vacuum insulated structure.
Figure 3:
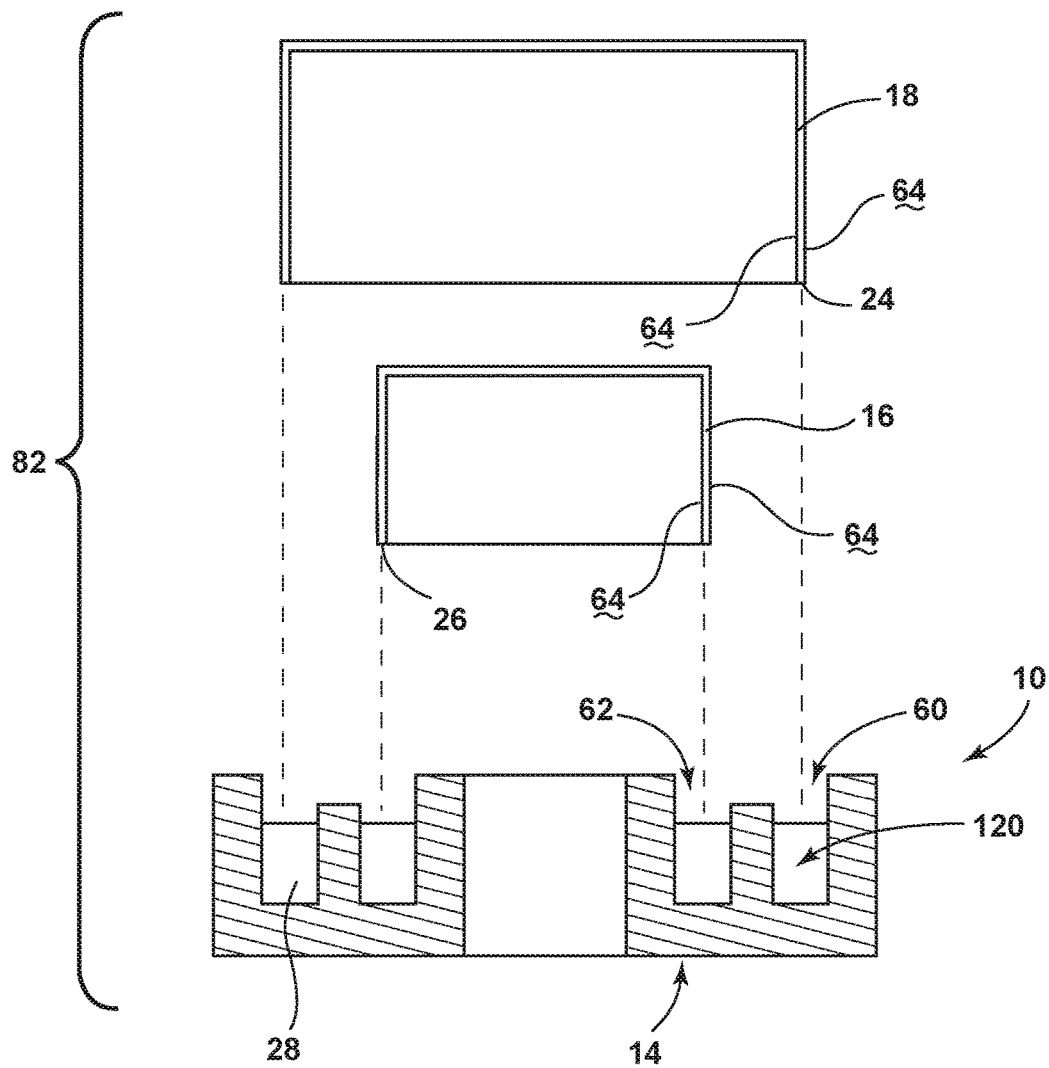
FIG. 3 is a schematic cross-sectional view of an inner liner and outer wrapper being installed within an elastic adhesive during formation of the encapsulation system.
Figure 5:
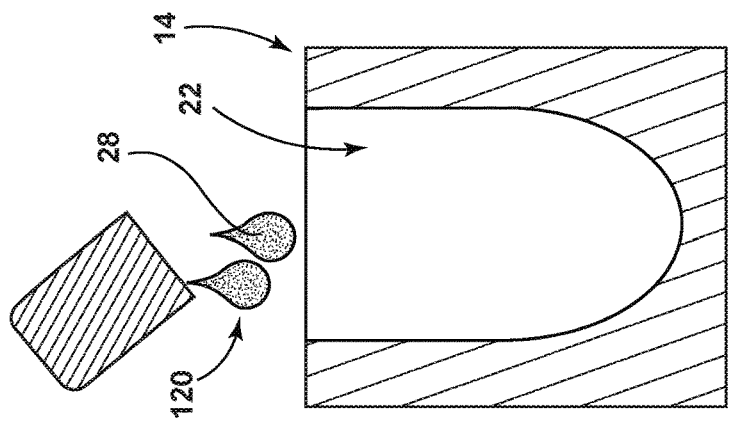
FIG. 5 is a schematic cross-sectional view of a channel of a trim breaker and showing the elastic adhesive in an uncured state being poured into the channel.
Figure 4:
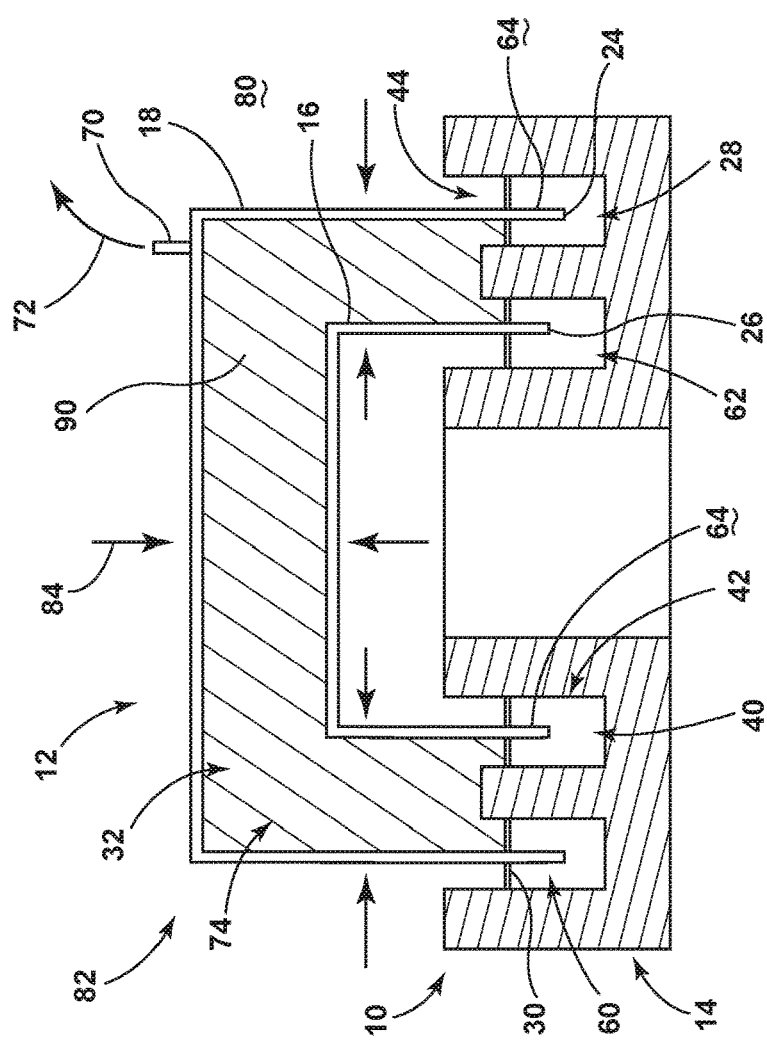
FIG. 4 is a cross-sectional view of the cabinet of FIG. 2, taken along line IV-IV, showing the expression of gas from the insulation cavity of the vacuum insulated structure.
Figure 7:
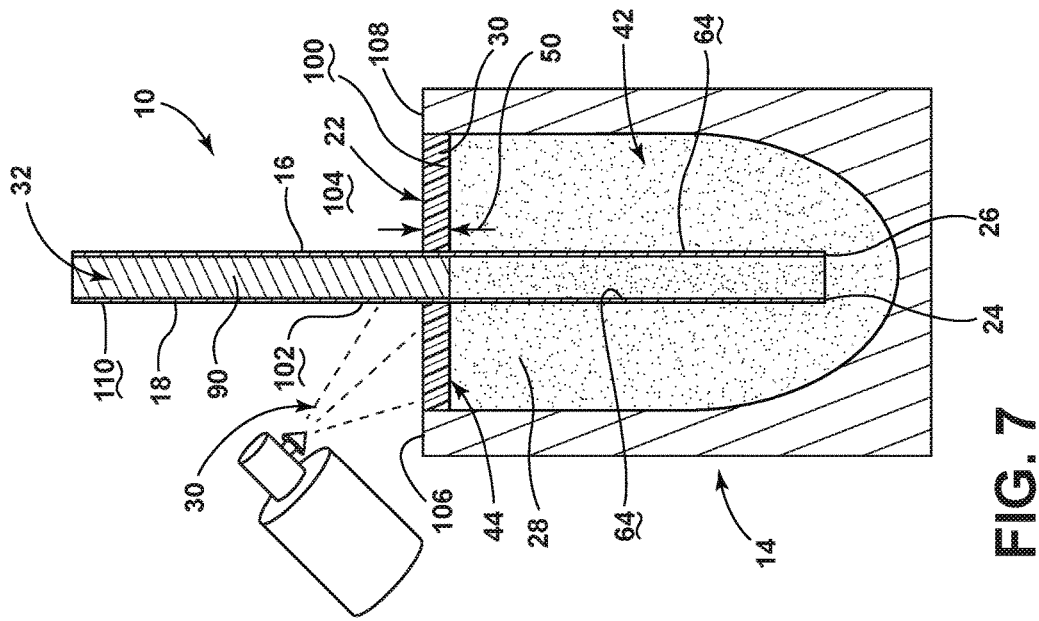
FIG. 7 is a schematic cross-sectional view of the channel of FIG. 6 showing application of the outer barrier coating to form the encapsulation system for the appliance.
Figure 6:
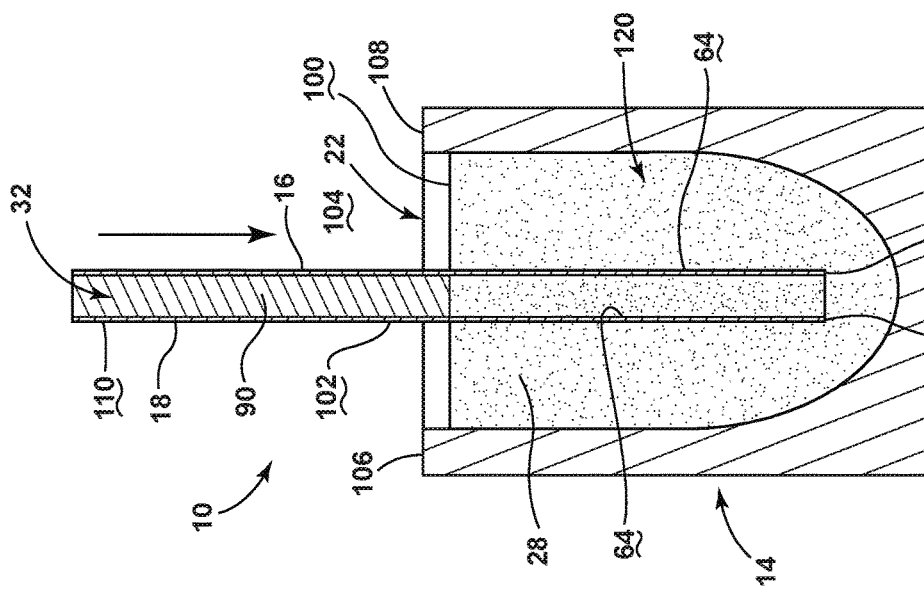
FIG. 6 is a schematic cross-sectional view of the channel of FIG. 5 showing the outer wrapper and inner liner being disposed within the channel and surrounded by the elastic adhesive.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-4, reference numeral 10 generally refers to a composite encapsulation system incorporated within a vacuum insulated structure 12 that provides a sealing connection between a trim breaker 14 and the inner liner 16 and outer wrapper 18 for the appliance 20. According to the various embodiments, the appliance 20 can include the outer wrapper 18 and inner liner 16. The trim breaker 14 includes a channel 22 that is adapted to receive at least one of a wrapper edge 24 of the outer wrapper 18 and/or a liner edge 26 of the inner liner 16. The composite encapsulation system 10 is disposed within the channel 22 and includes a base elastic adhesive 28 and an outer barrier coating 30. The base elastic adhesive 28 and the outer barrier coating 30 define an adhesive and structural connection that hermetically seals an insulation cavity 32 defined between the outer wrapper 18, the inner liner 16 and the trim breaker 14.

Referring again to FIGS. 1-4, the composite encapsulation system 10 is a multi-component material that provides a structural adhesive 40 in the form of a cured state 42 of the base elastic adhesive 28. The composite encapsulation system 10 also provides a sealing portion 44 in the form of the outer barrier coating 30. The combination of the base elastic adhesive 28 and the outer barrier coating 30 provides a robust connection between the trim breaker 14 and the inner liner 16 and outer wrapper 18 and also provides a hermetic sealing capability through the incorporation of the outer barrier coating 30.

As exemplified in FIGS. 1-9, the base elastic adhesive 28 can take the form of a polyurethane adhesive having cross-linked urethane polymers. This material provides a robust connection between the plastic of the trim breaker 14 and the material of the inner liner 16 and outer wrapper 18, which is typically metallic. It has been noted that limited amounts of oxygen and water vapor may be able to penetrate through this base elastic adhesive 28, which can allow for an increase in the pressure of the vacuum 74 defined within the insulation cavity 32. To decrease the permeability of the composite encapsulation system 10, the barrier coating 30 is added which has a greater resistance to oxygen and water vapor permeability.

It is contemplated that the base elastic adhesive 28 can also be made of various silicone-based adhesives and can also be made from various urethane polymers. Some of these urethane polymers can be made with a chemical base of an isocyanate group. Such silicone and urethane-based adhesives can be referred to as elastic adhesives 28 due to an extraordinary elasticity and elongation before correction occurs within the cured state 42 of the base elastic adhesive 28, referred to herein as the structural elastic base adhesive. This elasticity and elongation is combined with the permeation resistance of the outer barrier coating 30 to form the composite encapsulation system 10 described herein.

Referring again to FIGS. 1-4, the barrier coating 30 of the composite encapsulation system 10 can be in the form of a non-metal coating. Such non-metal coatings can include, but are not limited to, polyvinylidene, chloride coatings and fluoropolymer coatings and other similar non-metal coatings. The barrier coating 30 can also take the form of a metal coating. Such metal coatings can include, but are not limited to, various aluminum coatings that are applied by various processes, including physical vapor deposition. The barrier coating 30 can also be made of high barrier sol-gel coatings. Such coatings can include, but are not limited to, silica, zirconia, nano-ceramic coatings, and other similar coatings. It is also contemplated that various combinations of these non-metallic coatings, metallic coatings, and high-barrier sol-gel coatings can be used as part of the composite encapsulation system 10. These barrier coatings 30 serve to block oxygen and moisture from entering into the insulation cavity 32 that might increase the pressure within the vacuum 74 and ultimately decrease the insulating capability of the vacuum insulated structure 12. In this manner, the barrier coating 30 supplements the base elastic adhesive 28 to add sealing functionality to the composite encapsulation system 10.

Referring now to FIGS. 3-7, it is contemplated that the barrier coating 30 can be applied through various processes. Such processes can include spray-type processes where the outer barrier coating 30 is applied as a spray-type coating. In such an embodiment, it is contemplated that the spray-type barrier coating 30 can be applied either before or after the base elastic adhesive 28 defines a hardened or cured state 42. Typically, the outer barrier coating 30 will be applied after the base elastic adhesive 28 defines this cured state 42 such that the outer barrier coating 30 can provide a layer of substantially consistent thickness 50 for decreasing the permeability of the composite encapsulation system 10.

Referring again to FIGS. 2-4, it is contemplated that the channel 22 defined within the trim breaker 14 can include a wrapper channel 60 that receives the wrapper edge 24 and a separate liner channel 62 that receives the liner edge 26. In the various embodiments, each channel 22 can typically define a U-shaped channel 22 that first receives the elastic adhesive 28. Through this configuration, the base elastic adhesive 28 can completely surround both sides 64 of each of the wrapper edge 24 and liner edge 26.

According to various embodiments, it is contemplated that one of the inner liner 16 and outer wrapper 18 can be fitted with a gas port 70 that can be used to express and/or expel gas 72 from within the insulation cavity 32 to define an at least partial vacuum 74 within the insulation cavity 32. Typically, this gas port 70 will be used only after the composite encapsulation system 10 is completely formed and has a substantial resistance to gas 72 and vapor permeability. As gas 72 is drawn through the gas port 70, the composite encapsulation system 10 resists the permeation of gas 72 and water vapor from an exterior 80 of the structural cabinet 82 of the appliance 20 and into the insulation cavity 32. During the expression of gas 72, it is contemplated that limited movement of the inner liner 16 and outer wrapper 18 may be experienced as a result of vacuum bow or inward compressive force 84 within the cabinet 82 during expression of gas 72.

According to the various embodiments, the use of the silicone polyurethane or other similar urethane-based adhesive for the base elastic adhesive 28 will allow the composite encapsulation system 10 to at least partially flex without diminishing the resistance to permeability provided by the composite encapsulation system 10. Accordingly, the combination of the base elastic adhesive 28 and the outer barrier coating 30 provides a robust connection and also provides an at least partially flexible connection to account for various movements between the trim breaker 14, the inner liner 16 and the outer wrapper 18 during formation of the vacuum insulated structure 12 and also over the life of the appliance 20. Additionally, an insulation material 90 is typically disposed within the insulation cavity 32, such that when the gas 72 is expressed through the gas port 70, the insulation cavity 32 will be substantially occupied by the insulation material 90 with a minimal amount of gas 72 contained therein.

Figure 9:
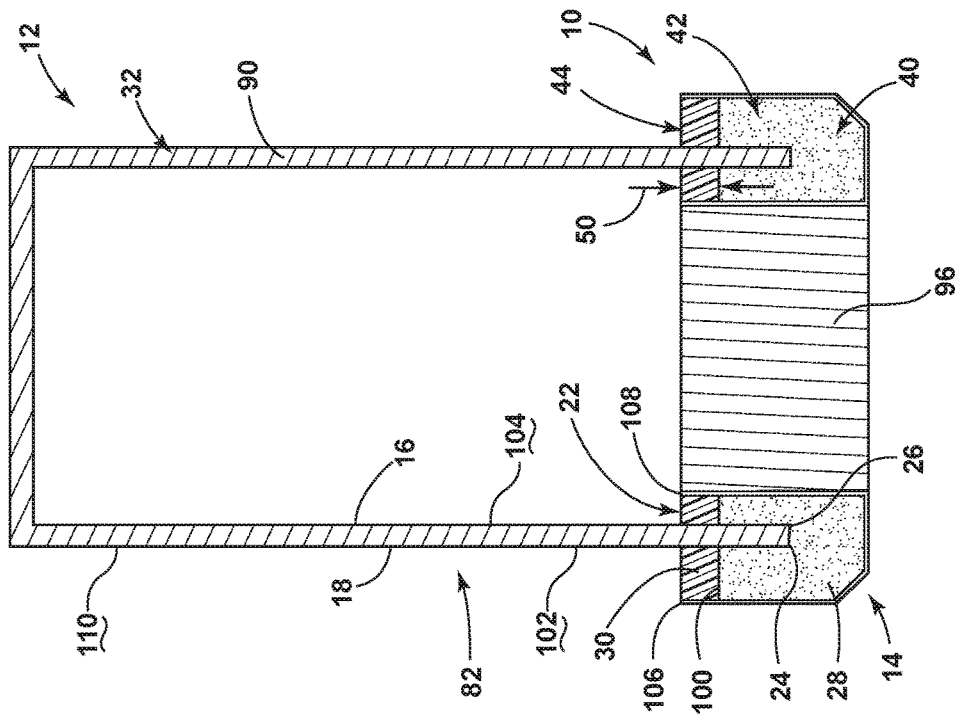
FIG. 9 is a schematic cross-sectional view of the appliance of FIG. 8 showing the inner liner and outer wrapper being installed within the trim breaker assembly and the encapsulation system sealing the joint therebetween.
Figure 8:
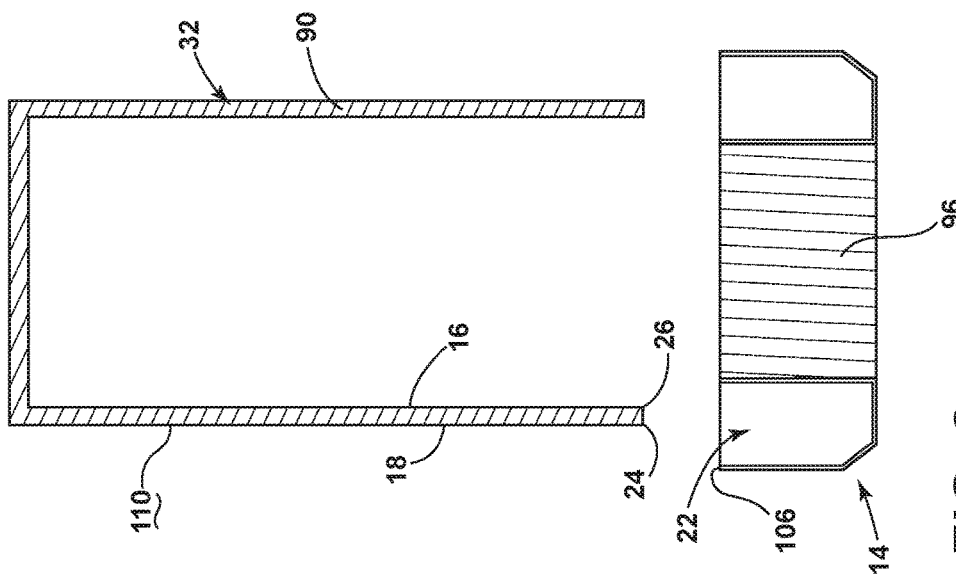
FIG. 8 is a schematic cross-sectional view of an aspect of an appliance cabinet being installed within a trim breaker assembly.
Figure 10:
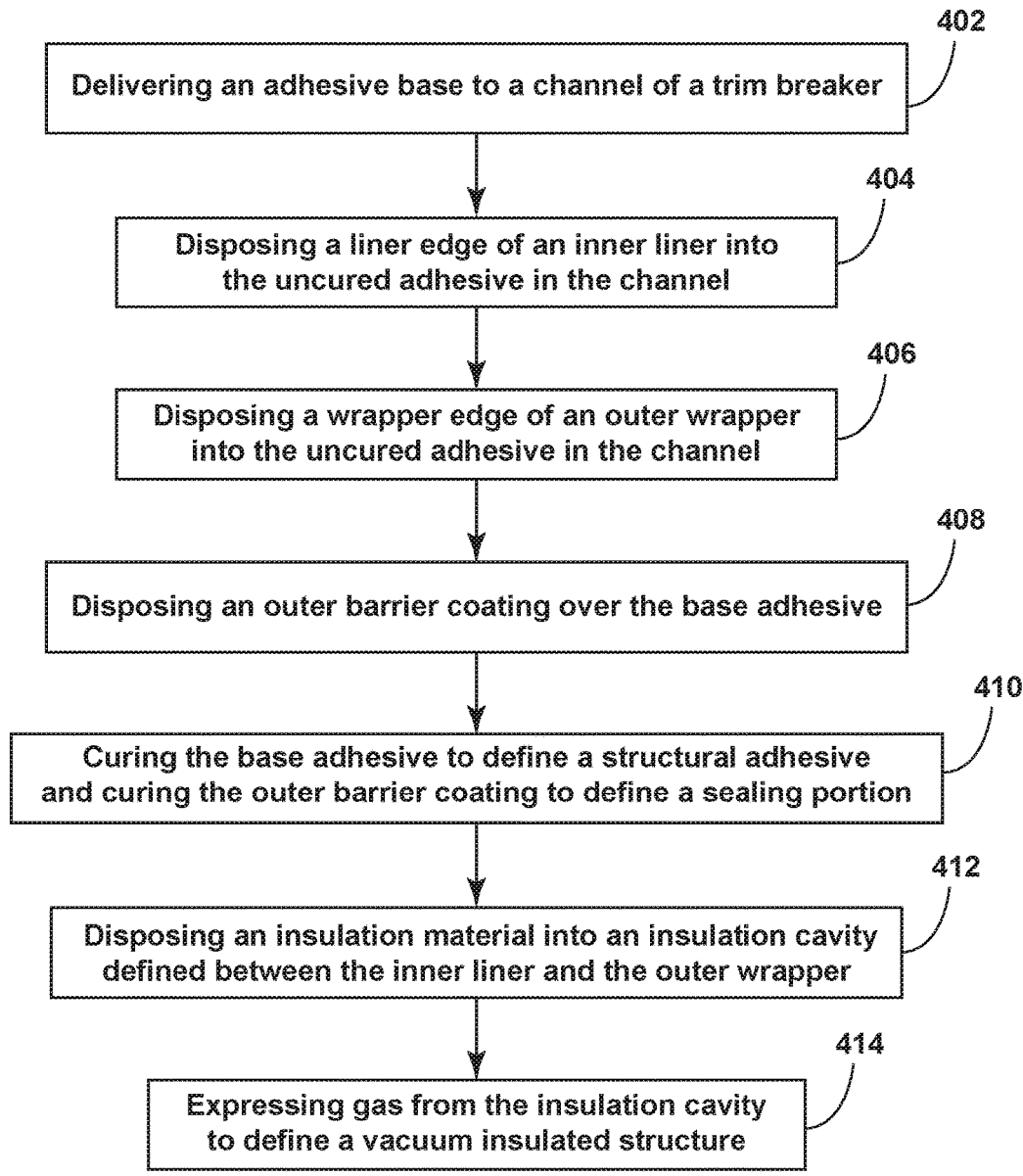
FIG. 10 is a schematic flow diagram illustrating a method for forming an insulating cabinet for an appliance.

Referring now to FIGS. 8 and 9, it is possible that both the inner liner 16 and outer wrapper 18 of the cabinet 82 can be disposed within a single channel 22 defined within the trim breaker 14. In such an embodiment, the inner liner 16 and outer wrapper 18 are disposed within the same channel 22 and within an uncured state 120 of the base elastic adhesive 28 that has been disposed within the channel 22. Accordingly, the external surface 100 of the base elastic adhesive 28 contained within the insulation cavity 32 between the inner liner 16 and outer wrapper 18 may be inaccessible for application of the outer barrier coating 30. In such an instance, it is contemplated that the outer barrier coating 30 may be disposed proximate an outside surface 102 of the outer wrapper 18 and an inside surface 104 of the inner liner 16. In this manner, the outer barrier coating 30 can extend from an outside edge 106 of the trim breaker 14 to the outside surface 102 of the outer wrapper 18 and also extend from an inner edge 108 of the trim breaker 14 to the inside surface 104 of the inner liner 16. Accordingly, the outer barrier coating 30 may only be disposed proximate an exterior surface 110 of the cabinet 82. To hold the trim breaker 14 and the channel 22 in a relatively steady and stable position, a pedal 96 can be placed proximate the trim breaker 14. The pedal 96 can serve to resist bending, flexing and other deformation during manufacture of the cabinet 82.

It is also contemplated that such a configuration may exist where the inner liner 16 and outer wrapper 18 are disposed within the dedicated liner and wrapper channels 62, 60 defined within the trim breaker 14. During formation of the cabinet 82 in such a configuration, the area between the inner liner 16 and outer wrapper 18 may be inaccessible for placement of the outer barrier coating 30 after the inner liner 16 and outer wrapper 18 have been placed within the base elastic adhesive 28 disposed within the liner channel 62 and wrapper channel 60.

According to various embodiments, the inner liner 16 and/or the outer wrapper 18 may include a dedicated port that can allow for the deposition of the outer barrier coating 30 onto the external surface 100 of the base elastic adhesive 28 that is disposed between the inner liner 16 and the outer wrapper 18. In this manner, it is possible that the entire external surface 100 of the base elastic adhesive 28 may be covered by the outer barrier coating 30. Typically, the area covered by the outer barrier coating 30 is the area to the exterior 80 of the inner liner 16 and outer wrapper 18 that can be easily accessed after the inner liner 16 and outer wrapper 18 are disposed within the base elastic adhesive 28. During the expression or expulsion of gas 72 via the gas port 70, this area covered by the outer barrier coating 30 is the most likely area of air and vapor infiltration into the insulation cavity 32. By covering these areas to the exterior 80 of the inner liner 16 and outer wrapper 18, the heightened permeability provided by the outer barrier coating 30 provides the composite encapsulation system 10 with the ability to significantly limit this infiltration during the expression of gas 72 and also during the life of the cabinet 82 for the appliance 20.

Referring now to FIGS. 1-10, having described various aspects of the composite encapsulation system 10, a method 400 is disclosed for forming an insulated cabinet 82 for an appliance 20. According to the method 400, a base elastic adhesive 28 is delivered in an uncured state 120 to a channel 22 of the trim breaker 14 (step 402). While the base elastic adhesive 28 is in the uncured state 120, the liner edge 26 of the inner liner 16 is disposed into the channel 22 (step 404). In this manner, the base in the uncured state 120 is allowed to surround both sides 64 of the liner edge 26. In this manner, when the base elastic adhesive 28 achieves the cured state 42, the base elastic adhesive 28 defines the structural adhesive 40 and can provide a robust connection between the trim breaker 14 and the liner edge 26. The wrapper edge 24 of the outer wrapper 18 can also be disposed into the channel 22 so that the base elastic adhesive 28 in the uncured state 120 surrounds both sides 64 of the wrapper edge 24 within the channel 22 (step 406). Positioning of the liner edge 26 and wrapper edge 24 can be simultaneously or one can be installed before the other. Typically, since the outer wrapper 18 extends around the inner liner 16, the inner liner 16 will be disposed within the trim breaker 14 first and then the outer wrapper 18 will be disposed around the inner liner 16. Accordingly, the wrapper edge 24 can fit around the liner edge 26 to be installed within the channel 22 of the trim breaker 14.

Referring again to FIGS. 1-10, after the liner edge 26 and wrapper edge 24 have been disposed within the channel 22 of the trim breaker 14 and within the base elastic adhesive 28, the outer barrier coating 30 can be disposed over the base elastic adhesive 28 (step 408). Step 408 can occur either before or after the base elastic adhesive 28 has achieved the cured state 42. Typically, the barrier coating 30 will be disposed over the external surface 100 of the base elastic adhesive 28 after the base elastic adhesive 28 achieves the cured state 42. In this manner, the barrier coating 30 covers the base elastic adhesive 28 and engages the outer wrapper 18 and inner liner 16 at the trim breaker 14. The barrier coating 30 is then cured to define the two-part encapsulation system 10 having the base elastic adhesive 28 that defines a structural adhesive 40 and the barrier coating 30 that defines a sealing portion 44 (step 410).

Referring again to FIGS. 1-10, the method 400 can include a step 412 of disposing an insulation material 90 within the insulation cavity 32 defined between the inner liner 16 and the outer wrapper 18. It is contemplated that this step 412 can occur after the barrier coating 30 has been cured such that the insulation material 90 is disposed within the insulation cavity 32 via an insulation port (not shown). It is also contemplated that this step 412 can occur before one or both of the inner liner 16 and outer wrapper 18 are disposed within the channel 22 of the trim breaker 14. In such an embodiment, the insulation material 90 can be disposed over the inner liner 16 which has been disposed within the channel 22 and the outer wrapper 18 is positioned over the inner liner 16 and insulation material 90. It is also contemplated that the insulation material 90 can be disposed between the inner liner 16 and outer wrapper 18 and then these components can simultaneously be disposed within the channel 22 of the trim breaker 14. After the insulation material 90 is disposed within the outer wrapper 18 and the barrier coating 30 has been cured to define the composite encapsulation system 10, gas 72 can be expressed or expelled from the insulation cavity 32 and the insulation material 90 defined within the insulation cavity 32 to define an at least partial vacuum 74 within the insulation cavity 32 (step 414). As discussed previously, the base elastic adhesive 28 and barrier coating 30, when cured to form the composite encapsulation system 10, permit at least partial movement of the inner liner 16 and outer wrapper 18 while maintaining the hermetic seal between the inner liner 16 and the trim breaker 14 and between the outer wrapper 18 and the trim breaker 14.

According to various embodiments, where the outer barrier coating 30 is disposed only proximate the exterior surface 110 of the cabinet 82 at the inner liner 16 and outer wrapper 18, it is contemplated that portions of the insulation material 90 may engage the external surface 100 of the base elastic adhesive 28 that has been cured to define a cured structural adhesive 40 that serves as the base of the composite encapsulation system 10. It is also contemplated that the outer barrier coating 30 may be disposed between the cured structural adhesive 40 and the insulation material 90. Positioning the barrier outer coating between these materials may be performed where the insulation material 90 may not be chemically compatible with the cured structural adhesive 40.

Referring now to FIGS. 1-9 and 11, according to the various embodiments, a method 500 for forming an insulating cabinet 82 for an appliance 20 is also disclosed. According to this method 500, a base elastic adhesive 28 is delivered in an uncured state 120 into a wrapper channel 60 and a liner channel 62 of the trim breaker 14 (step 502). Subsequently, the liner edge of an inner liner 16 is disposed into the liner channel 62 so that the elastic adhesive 28 in the uncured state 120 surrounds both sides 64 of the liner edge 26 within the liner channel 62 (step 504). A wrapper edge 24 of an outer wrapper 18 is also disposed into the wrapper channels 60, so that the base elastic adhesive 28 that serves as the base of the composite encapsulation system 10 in the uncured state 120 can surround both sides 64 of the wrapper edge 24 within the wrapper channel 60 (step 506). The elastic adhesive 28 is then cured to define the elastic structural adhesive 40 that serves as the base of the composite encapsulation system 10 (step 508). A barrier coating 30 can then be disposed over the elastic structural adhesive 40 (step 510). The barrier coating 30 extends, typically, from an outside edge 106 of the trim breaker 14 to an outside surface 102 of the outer wrapper 18 and also extends from an inner edge 108 of the trim breaker 14 to an inside surface 104 of the inner liner 16. As discussed above, it is contemplated that disposing the barrier coating 30 within the insulation cavity 32 and between the inner liner 16 and the outer wrapper 18 is also possible. The barrier coating 30 is then cured to define the composite encapsulation system 10 having the elastic structural adhesive 40 that defines a structural component and the barrier coating 30 in a cured state 42 that defines a sealing component (step 512).

Through the use of the various aspects of the composite encapsulation system 10, as disclosed herein, it is possible that the use of the outer barrier coating 30 can decrease the oxygen transmission rate of various elastic-type adhesives from approximately one thousand cubic centimeters per square meter per day to lower them approximately 0.1 cubic centimeter per square meter per day. Additionally, the use of the outer barrier coating 30 can also decrease the water vapor transmission rate of elastic-type adhesives from approximately 10 grams per square meter per day to lower than approximately 0.01 grams per square meter per day.

The use of the composite encapsulation system 10 for attaching the metallic inner liner 16 and metallic outer wrapper 18 to the plastic trim breaker 14 provides a robust bond strength and also prevents oxygen water vapor from penetrating into the at least partial vacuum 74 of the insulation cavity 32.

According to the various embodiments, the composite encapsulation system 10 described herein can be used in any one of various appliances 20 that incorporate a vacuum insulated structure 12. These appliances 20 and components of appliances 20 can include, but are not limited to, refrigerators, coolers, freezers door panels, ovens, dishwashers, water heaters, laundry appliances, and other similar appliances 20 and household and/or commercial fixtures.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An appliance comprising:
    an outer wrapper;
    an inner liner;
    a trim breaker having a channel that receives at least one of a wrapper edge of the outer wrapper and a liner edge of the inner liner;
    a composite encapsulation system including a base elastic adhesive and an outer barrier coating, wherein the base elastic adhesive and the outer barrier coating define a structural adhesive that seals an insulation cavity defined between the outer wrapper and the inner liner.

2. The appliance of claim 1, wherein the channel includes a wrapper channel that receives the wrapper edge and a separate liner channel that receives the liner edge.

3. The appliance of claim 1, wherein the outer barrier coating is a spray-type coating.

4. The appliance of claim 3, wherein the spray-type coating is applied after the base elastic adhesive defines a cured state.

5. The appliance of claim 1, wherein the base elastic adhesive is a polyurethane adhesive having cross-linked urethane polymers.

6. The appliance of claim 1, wherein the inner liner and the outer wrapper are metallic and the trim breaker is plastic.

7. The appliance of claim 1, wherein the insulation cavity defines an at least partial vacuum.

8. The appliance of claim 1, wherein the outer barrier coating is a non-metal coating.

9. The appliance of claim 1, wherein the outer barrier coating is a metallic coating.

10. The appliance of claim 9, wherein the metallic coating is applied through physical vapor deposition.

11. The appliance of claim 1, further comprising:
an insulation material disposed within the insulation cavity.

12. The appliance of claim 11, wherein the insulation material at least partially engages the base elastic adhesive.

13. The appliance of claim 1, wherein the outer barrier coating is disposed at least at an outside surface of the outer wrapper and an inside surface of the inner liner.

14. A method for forming an insulating cabinet for an appliance, the method comprising steps of:
delivering an adhesive base in an uncured state into a channel of a trim breaker;
disposing a wrapper edge of an outer wrapper into the channel so that the adhesive base in the uncured state surrounds both sides of the wrapper edge within the channel;
disposing a liner edge of an inner liner into the channel so that the adhesive base in the uncured state surrounds both sides of the liner edge within the channel;
disposing a barrier coating over the adhesive base, wherein the barrier coating covers the adhesive base and engages the outer wrapper and inner liner at the trim breaker; and
curing the barrier coating to define a two-part encapsulation system having the adhesive base that defines a structural component and the barrier coating that defines a sealing component.

15. The method of claim 14, wherein the step of disposing the barrier coating over the adhesive base includes first curing the adhesive base to define a cured structural adhesive.

16. The method of claim 14, wherein the barrier coating is a spray-type coating that is applied after the adhesive base defines a cured state.

17. The method of claim 14, wherein the barrier coating is applied using physical vapor deposition.

18. A method for forming an insulating cabinet for an appliance, the method comprising steps of:
delivering an elastic adhesive base in an uncured state into a wrapper channel and a liner channel of a trim breaker;
disposing a wrapper edge of an outer wrapper into the wrapper channel so that the elastic adhesive base in the uncured state surrounds both sides of the wrapper edge within the wrapper channel;
disposing a liner edge of an inner liner into the liner channel so that the elastic adhesive base in the uncured state surrounds both sides of the liner edge within the liner channel;
curing the elastic adhesive base to define a structural elastic adhesive base;
disposing a barrier coating over the structural elastic adhesive base, wherein the barrier coating extends from an outer edge of the trim breaker to an outside surface of the outer wrapper and also extends from an inner edge of the trim breaker to an inside surface of the inner liner;
curing the barrier coating to define a two-part encapsulation system having the structural elastic adhesive base that defines a structural component and the barrier coating in a cured state that defines a sealing component;
disposing an insulation material within an insulation cavity defined between the inner liner and the outer wrapper; and
expressing gas from the insulation cavity and the insulation material defined within the insulation cavity to define an at least partial vacuum within the insulation cavity, wherein the structural elastic adhesive base permits at least partial movement of the inner liner and the outer wrapper while maintaining a seal between the inner liner and the trim breaker and between the outer wrapper and the trim breaker.

19. The method of claim 18, wherein the insulation cavity defines an at least partial vacuum.

20. The method of claim 18, wherein the barrier coating is applied using physical vapor deposition.

* * * * *